(12) United States Patent  
Moeller et al.

(10) Patent No.: US 9,377,009 B2
(45) Date of Patent: Jun. 28, 2016

(54) SINGLE PIECE ELECTRIC ASSEMBLY FOR CONNECTING AN OFF-SHORE WIND TURBINE WITH AN ELECTRIC SUBSEA CABLE, WIND TURBINE, WIND TURBINE CLUSTER AND METHOD FOR MOUNTING SUCH AN ELECTRIC ASSEMBLY TO A WIND TURBINE TOWER

(71) Applicant: Siemens Aktiengesellschaft, Munich (DE)

(72) Inventors: Jesper Moeller, Esbjerg (DK); Henrik Stiesdal, Odense C (DK); Jan Thisted, Tjele (DK)

(73) Assignee: Siemens Aktiengesellschaft, Munich (DE)

( * ) Notice: Subject to any disclaimer, the term of this patent is extended or adjusted under 35 U.S.C. 154(b) by 2 days.

(21) Appl. No.: 14/504,652

(22) Filed: Oct. 2, 2014

(65) Prior Publication Data

US 2015/0108764 A1 Apr. 23, 2015

(30) Foreign Application Priority Data

Oct. 17, 2013 (EP) .................................... 13189175

(51) Int. Cl.
*F03D 11/00* (2006.01)
*F03D 9/00* (2016.01)
(Continued)

(52) U.S. Cl.
CPC ................ *F03D 9/005* (2013.01); *F03D 1/001* (2013.01); *F03D 9/003* (2013.01); *F03D 11/00* (2013.01);
(Continued)

(58) Field of Classification Search
CPC ........................................................ F03D 11/04
USPC ............................................................. 290/55
See application file for complete search history.

(56) References Cited

U.S. PATENT DOCUMENTS 6,400,039 B1 6/2002 Wobben
6,664,493 B2 * 12/2003 Yamada ................... H02B 5/06
218/43

(Continued)

FOREIGN PATENT DOCUMENTS

DE 10013442 C1 10/2001
DE 102007062622 A 6/2009
(Continued)

OTHER PUBLICATIONS

Peter Christiansen et al., "Grid Connection and Remote Control for the Horns Rev 150 MW Offshore Wind Farm in Denmark", Denmark, pp. 1-11.

*Primary Examiner* — Joseph Waks
(74) *Attorney, Agent, or Firm* — Beusse Wolter Sanks & Maire

(57) ABSTRACT

An electric assembly for electrically connecting at least one wind turbine being located off-shore with an electric subsea cable being connected to an on-shore power grid is provided. The electric assembly has (a) a transformer for transforming a first voltage level being provided by the at least one wind turbine to a second voltage level of the subsea cable, and (b) an external equipment being electrically and mechanically connected to the transformer for controlling an operation of at least the transformer. The transformer and the electric equipment are formed by a preinstalled package, which can be mechanically handled as a single piece. Further, a wind turbine having such an electric assembly, a wind turbine cluster having such a wind turbine, and a method for mounting such an electric assembly to a tower of a wind turbine are provided.

13 Claims, 4 Drawing Sheets

(51) Int. Cl.
  *F03D 1/00* (2006.01)
  *H01F 27/40* (2006.01)

(52) U.S. Cl.
  CPC ............ *H01F 27/40* (2013.01); *F05B 2230/60* (2013.01); *F05B 2240/95* (2013.01); *Y02E 10/722* (2013.01); *Y02P 70/523* (2015.11); *Y10T 29/49117* (2015.01)

(56) References Cited

U.S. PATENT DOCUMENTS

| | | | | |
|---|---|---|---|---|
| 7,075,189 B2 * | 7/2006 | Heronemus | ............... | F03D 9/00 290/44 |
| 7,119,453 B2 * | 10/2006 | Bywaters | ............. | F03D 7/0248 290/44 |
| 2007/0296220 A1 * | 12/2007 | Kristensen | ............. | F03D 1/001 290/55 |
| 2008/0164966 A1 | 7/2008 | Findeisen | | |
| 2010/0196100 A1 * | 8/2010 | Soe-Jensen | ............... | H02G 1/10 405/169 |
| 2011/0304141 A1 * | 12/2011 | Van Dyck | ............. | H02J 3/1878 290/44 |
| 2012/0146335 A1 | 6/2012 | Cole et al. | | |
| 2015/0275850 A1 * | 10/2015 | Numajiri | ................. | F03D 1/003 290/55 |

FOREIGN PATENT DOCUMENTS

| | | | | |
|---|---|---|---|---|
| DE | 102007062622 A1 * | 6/2009 | ............ | F03D 11/005 |
| EP | 1240426 B1 | 9/2004 | | |
| EP | 1071883 B1 | 1/2005 | | |
| EP | 2811160 A1 * | 12/2014 | .......... | F03D 11/0058 |
| ES | 2333761 A1 * | 2/2010 | | |
| KR | 2013002882 U * | 5/2013 | | |
| WO | 0146583 A2 | 6/2001 | | |
| WO | 2006069974 A1 | 7/2006 | | |
| WO | 2008039121 A1 | 4/2008 | | |
| WO | WO 2008039121 A1 * | 4/2008 | .............. | H02J 3/386 |

* cited by examiner

SINGLE PIECE ELECTRIC ASSEMBLY FOR CONNECTING AN OFF-SHORE WIND TURBINE WITH AN ELECTRIC SUBSEA CABLE, WIND TURBINE, WIND TURBINE CLUSTER AND METHOD FOR MOUNTING SUCH AN ELECTRIC ASSEMBLY TO A WIND TURBINE TOWER

CROSS REFERENCE TO RELATED APPLICATIONS

This application claims the benefit of European Application No. EP13189175 filed Oct. 17, 2013, incorporated by reference herein in its entirety.

FIELD OF INVENTION

The present invention generally relates to the technical field of wind turbines and in particular to wind turbines being erected off-shore. Specifically, the present invention relates to the electric connection of at least one off-shore wind turbine to a subsea cable. In particular, the present invention relates to an electric assembly comprising a transformer and external equipment for electrically connecting at least one wind turbine being located off-shore with an electric subsea cable being connected to an on-shore power grid. Further, the present invention relates to a wind turbine comprising such an electric assembly, to a wind turbine cluster comprising such a wind turbine and to a method for mounting such an electric assembly to a tower of a wind turbine.

ART BACKGROUND

Electric power which has been generated by an off-shore wind farm or a cluster of wind turbines is transmitted to an on-shore utility grid by either AC or DC transmission lines. For shorter distances typically AC transmission is used but AC cables are affected by capacitive charging which limits the length that can be realistically used to about maybe 100 km.

From the publication "Grid Connection and Remote Control for the Horns Rev 150 MW Offshore Wind Farm in Denmark" by Peter Christiansen et al. it is known that the individual wind turbines of a wind farm can be arranged in a plurality of rows, wherein each row consists of a number of serial connected wind turbines. The rows are interconnected at an off-shore transformer sub-station comprising busbars, a transformer and circuit breakers. The off-shore transformer sub-station is positioned on a separate foundation.

Electric power from the individual wind turbines is produced at some specific generator voltage which according to the above-identified publication is transformed in each wind turbine to an intermediate AC voltage level for the transmission of the generated electric power to an off-shore transformer sub-station. Intermediate AC voltage level transmission lines can interconnect the corresponding individual wind turbines in each row and can connect the rows to the off-shore transformer sub-station. The basic task for the off-shore transformer sub-station is to transform the AC power from the concatenated wind turbines from the intermediate AC voltage level to at high AC voltage level. The intermediate AC voltage level may be e.g. 24 kV, the high AC voltage level may be e.g. 150 kV AC.

EP 1 071 883 B1 discloses a wind turbine having a generator, a tower, a foundation on which the tower is provided, and a transformer, which is connected to the generator in order to transfer the electrical power that is produced to a utility grid. The weights of the tower, the generator and the transformer are borne solely by the foundation of the wind turbine. The transformer is arranged on a platform which is attached to the outside of the tower.

EP 1 240 426 B1 discloses an off-shore wind turbine having a tower, a rotor head, at least one rotor blade and an electric subsystems such as switching equipment and/or a transformer, which are housed in at least one container positioned interchangeably at the outside of the tower of the wind turbine. The container is suspended from a supporting framework structure fitted to the tower. This framework structure contains a cable system for lowering and replacing the container.

WO 2008/039121 A1 discloses a wind farm having a plurality of off-shore wind turbines distributed over an area. Each off-shore wind turbine comprises a generator and a first step-up transformer for raising the voltage of the electric power signal generated by the generator. Each off-shore wind turbine is connected, by means of cables, to a further second step-up transformer connected to a main cable in common to all off-shore wind turbines for transfer of the total power generated by the wind farm to a utility grid being located at a considerable distance to said area. The off-shore wind turbines are interconnected in groups. Each group is connected to a separate second step-up transformer located in the region of the group. Further, each second step-up transformer is connected to the main cable in common to all the off-shore wind turbines. Each one of the second step-up transformers may be arranged in one of the wind turbines belonging to the respective group. The second step-up transformer may be arranged on a column structure of the respective wind turbine or on the foundation supporting this column structure.

However, when installing the second step-up transformer at the respective wind turbine the installation effort is serious. In particular, the electric and mechanic installation of the step-up transformer together with necessary electric equipment being external to the step-up transformer might cause a lot of trouble especially when considering rough environmental conditions at an off-shore location.

There may be a need for improving the installation of a step-up transformer at a wind turbine.

SUMMARY OF THE INVENTION

This need may be met by the subject matter according to the independent claims. Advantageous embodiments of the present invention are described by the dependent claims.

According to a first aspect of the invention there is provided an electric assembly for electrically connecting at least one wind turbine being located off-shore with an electric subsea cable being connected to an on-shore power grid. The provided electric assembly comprises (a) a transformer for transforming a first voltage level being provided by the at least one wind turbine to a second voltage level of the subsea cable, and (b) an external equipment being electrically and mechanically connected to the transformer for controlling an operation of at least the transformer. The transformer and the electric equipment are formed or realized by a preinstalled package, which can be mechanically handled as a single piece.

The provided electric assembly is based on the idea that when handling the electric assembly, e.g. when installing the electric assembly at a wind turbine being located off-shore, all components of the electric assembly can be handled as a single piece. This facilitates not only the installation of the electronic assembly but also a transportation of the electronic assembly to the site where the off-shore wind turbine is erected.

Descriptive speaking, the provided and described assembly of the transformer and the external equipment may form a single compact unit which may be suitable also for an outdoor operation.

In this document the term "preinstalled" may mean that the respective components, i.e. the transformer and the external equipment are mechanically connected with each other in a tight manner. Thereby, the procedure of mechanically connecting these components may be preferably carried out on-shore. Thereby, "mechanically connected in a tight manner" may mean that the transformer and the external equipment may be connected to each other in an inseparable or alternatively in a separable manner. In any way, the mechanical connection must be so tight that the risk of an unwanted separation of the electronic assembly is negligible.

Preferably, the transformer is designed in such a way that the external equipment can be installed directly at the transformer. The transformer including external equipment will then form one single unit in order to reduce an installation time at the place of erection of the electric assembly and in order to minimize the footprint of the electric assembly.

According to an embodiment of the invention the external equipment comprises a gas insulated switchgear. This may provide the advantage that the transformer can be switched on and off in a reliable manner. Even when electrically handling a high voltage power signal, which has to be switched when connecting the transformer to a high voltage (HV) subsea cable system and/or when enabling the usual operation the transformer, the risk of having damages due to the development of an electric arc can be reduced.

In case of an off-shore outdoor installation of the electric assembly a corresponding gas insulated switchgear (GIS) compartment shall be designed with the same level of corrosion protection as the transformer i.e. protection against a maritime and saline environment.

The GIS may be of any suitable type which can handle the power signals being involved with the generation of electric energy by means of in particular off-shore wind turbines. The GIS may use the gas sulfur hexafluoride (SF6) and its dielectric strength in order to effectively quench an electric arc which may has developed within the GIS compartment.

According to a further embodiment of the invention the external equipment comprises an earthing switch. This may provide the advantage that the transformer and/or other electric cables can be connected to ground e.g. in case a maintenance work has to be done. In this way a safe working condition for a maintenance man or woman can be realized in a simple and effective manner.

It is mentioned that in one embodiment the earthing switch can be integrated with the GIS.

According to a further embodiment of the invention the external equipment comprises an electric disconnector.

With an electric disconnector being electrically coupled to the transformer the transformer can be disconnected from the wind turbine and/or from the subsea cable. This can be done in case of emergency and/or in case of maintenance or service work which has to be done.

It is mentioned that in some configurations the described electric disconnector in combination with the above mentioned earthing switch may be needed for a safe operation of the electric assembly and/or for performing a riskless service work of the transformer. If proven necessary, the electric disconnector can be upgraded in order to act as protection circuit breaker.

According to a further embodiment of the invention the external equipment comprises a surge arrestor.

With the described surge arrestor being electrically connected to the transformer either directly or indirectly a protection against overvoltage situations can be achieved. In one embodiment the described surge arrestor for voltage surge protection can be integrated in the GIS compartment.

According to a further embodiment of the invention the external equipment comprises an electric connection arrangement for electrically connecting the electric assembly to a first cable termination arrangement being assigned to the wind turbine and/or to a second cable termination arrangement being assigned to the subsea cable.

The electric connection arrangement may allow for establishing a proper electric connection between (a) the described electric assembly on the one hand and (b1) the wind turbine and/or (b2) the subsea cable one the other hand in an automatic manner when the preinstalled electric assembly is mechanically connected or placed at a platform being configured for accommodating the electric assembly.

In order to facilitate such an electric connection in an easy and reliable manner the electric connection arrangement may comprise guiding side walls made from an electric conductive material. These guiding side walls may be oriented inclined with respect to an insertion direction when the electric assembly is placed on the above mentioned platform. This facilitates the establishment of a proper electric connection.

It is mentioned that the described electric connection arrangement may comprise one or more electric terminals. Preferably, the electric connection arrangement comprises one electric terminal for each phase of a rotary current. This may hold both for the electric connection (a) between the electric assembly respectively the transformer and the subsea cable and (b) between the electric assembly respectively the transformer and the wind turbine.

According to a further embodiment of the invention the external equipment comprises a cooling device for cooling the transformer. This may provide the advantage that apart from the electric equipment being assigned to the external equipment and being electrically and mechanically connected to the transformer in a direct or indirect manner also equipment, which is at the first instance not related to the electric system and to the electric operation of the transformer, can be preinstalled before the electric assembly is placed at its final destination (e.g. the above mentioned platform).

The cooling device may comprise cooling radiators and/or cooling fans which are thermically coupled to the transformer directly and/or indirectly via a stream of a proper heat transfer medium (e.g. heat transfer gas or a heat transfer liquid).

At this point it is mentioned that preferably all of the above mentioned components of the external equipment may be preinstalled in particular on-shore before the described electric assembly is installed, erected or placed at its final destination.

According to a further aspect of the invention there is provided a wind turbine comprising an electric assembly as described above.

The provided wind turbine is based on the idea that instead of erecting the above elucidated electric assembly off-shore onto a separate platform or a proper subsea station the electric assembly can be assigned to a wind turbine. This means that the electric assembly is directly or indirectly, e.g. via the tower of the wind turbine, mechanically connected to a foundation of the (off-shore) wind turbine.

The wind turbine comprising the electric assembly may be one wind turbine within a cluster of wind turbines. Thereby, the electric assembly may not only be used for connecting the described wind turbine to the subsea cable. The electric assembly may rather be connected also to at least one of the other wind turbines of the cluster which is not provided with such an electric assembly. In this case the described wind turbine may be called an AC booster wind turbine because the electric assembly and in particular the transformer will typically be used for increasing the voltage level provided by (the generators, the electric inverters, and/or a step-up transformer of) the individual wind turbines.

The voltage level of the input power signal provided by (the generator, the electric inverter and/or the step-up transformer of) the at least one wind turbine may be e.g. 33 kV or 66 kV. The voltage level of the output power signal provided by the (output of the) transformer of the electric assembly may be e.g. 132 kV, 150 kV or 220 kV. However, it is explicitly mentioned that these values are only exemplary and depending in the concrete application also other voltage levels may be provided.

On the medium voltage (MV) side (e.g. 33 kV or 66 kV) it may be possible to install a circuit breaker inside the tower in the described wind turbine. On the high voltage (HV) side (e.g. 132 kV, 150 kV or 220 kV) there should ideally not be installed a protection circuit breaker adjacent to the transformer on a platform of the assembly unit. As an alternative to a protection circuit breaker adjacent to the transformer a protection breaker can be installed on-shore between a high voltage alternating current (HVAC) export cable and a HV busbar at an on-shore substation.

According to a further embodiment of the invention the wind turbine further comprises (a) a tower and (b) a platform being mounted to the tower and being located outside of the tower. Thereby, the electric assembly is located on the platform. This may provide the advantage that an installation of the electric assembly to (the tower of) the wind turbine will be comparatively easy. This holds in particular for an off-shore wind turbine. The installation may be accomplished e.g. by means of a proper crane, which is shipped to the place of erection of the wind turbine.

The electric assembly with the transformer and the external equipment being provided within one package may be placed in open air without any housing or fire protection. This is in contrast to current off-shore wind turbine transformer installations which all are situated in some sort of housing. As has already been elucidated above the package of the electric assembly may include all the basic equipment which is needed for a safe operation and/or a maintenance service of the transformer.

Preferably, all equipment which is not needed in close vicinity of the transformer shall be placed on another location e.g. within the tower of the wind turbine or on an on-shore substation. With this measure the footprint of the outdoor equipment and, as a consequence, the size of the platform can be reduced.

Further, below the transformer there may be needed no cable deck (i.e. a platform for installing cables). Cables may rather be routed directly to the transformer level where they are split up and terminated. Thereby, an automatic plug in connection of the electric assembly transformer will be allowed and the traditional cable deck used on known HVAC and/or HVDC platforms will be saved.

Descriptive speaking, the transformer of the electric assembly being installed at the platform may replace a traditional substation transformer located on so called off-shore collector platforms. As has already been mentioned above, the voltage ratio on the transformer may raise the voltage from the voltage on the intra array system in an offshore wind farm from e.g. 33 kV or 66 kV to a higher voltage level suited for the electric export circuit(s), e.g. 132 kV, 150 kV or 220 kV.

At this point it is mentioned that the above described first cable termination arrangement being assigned to the wind turbine and/or the second cable termination arrangement being assigned to the subsea cable may be mounted at the platform of the wind turbine.

When installing the electric assembly at the platform the MV cables and the HV cables may be terminated at the platform before the electric assembly with the transformer arrives. The terminated cables may be fitted in appropriate support structures with an installation guide to allow for a direct connection of the corresponding plugs into a transformer connector box. The cables may be fitted with plug in connectors (female part) and fastened to a fixture in an exact position that will allow an automatic plug in of the cable connectors to the transformer when the electric assembly with the transformer is lifted up and set down on its exact position on the platform. The cable fixtures shall be designed in a way that allows for minor horizontal movements. A mechanical guidance shall ensure that the mechanical impact on the electrical connectors is kept at a minimum when the transformer is lowered to its position. The guiding system may ensure that the electrical connectors are guided to the right position for connection. Thereby, fully pre-commissioned and pre-terminated cables that will slot together in one operation during installation may allow for an automatic plug in connection of the transformer.

According to a further embodiment of the invention the wind turbine further comprises (a) a collecting tank for collecting a fluid being lost from the transformer, and (b) a fluid communication device for connecting the transformer with the collecting tank in such a manner that a fluid being lost from the transformer is transferred to the collecting tank.

This may provide the advantage that in case of a transformer malfunction where at least a part of the transformer fluid is released this fluid can be captured and a pollution of the environment can be avoided. The fluid may be a cooling fluid and/or an insulating fluid for the transformer.

The fluid communication device may include a collection tray which is arranged below the transformer and which may act as a funnel. The collection tray may be connected to the collecting tank by means of an appropriate drain pipe.

The collecting tank and the fluid communication device may be configured for handling oil. This may provide the advantage that the described collecting tank may be used for the most common liquids being used in particular in off-shore transformers.

According to a further embodiment of the invention the collecting tank is located within the tower of the wind turbine. This may provide the advantage that free space being available anyway can be utilized for collecting the fluid which, in particular in case of a malfunction or in case of emergency, may been released from the interior of the transformer.

The collecting tank can be formed by a bottom boundary and the inner wall of the tower acting as the lateral boundary of the collecting tank. The bottom boundary can be formed e.g. by a so called jacket leg which is connecting different tower sections or a flange connection which is connecting a pile (often called a monopile) being driven into the seabed and a transition piece of the tower.

For an oil insulated transformer, a suitable GIS transition may connect the transformer HV windings with the above mentioned external equipment i.e. earthing switch, electric disconnector, surge arrestor and electric connection arrangement.

The oil for insulating the transformer can either be synthetic ester oil or environment friendly vegetable oil.

It is mentioned that in the (unlikely) case that transformer oil is leaking out of the transformer the transformer oil needs to be collected in order to avoid a pollution by an oil spillage into the sea. On traditional HVAC/HVDC off-shore platforms an oil collecting tray under the transformer collects the oil and leads it to a tank also located under the transformer.

With the wind turbine described here the transformer is located on an open platform outside the tower of the wind turbine. However, an oil collecting tank under the transformer is avoided and as an alternative the oil is lead to an inner compartment of the pile/transition piece/jacket leg.

It is mentioned that with this oil collecting procedure it must be accepted that the oil may destroy equipment being located within the inner compartment of the respective tower compartment in the unlikely event that a comparatively large amount of oil is released from the transformer.

According to a further aspect of the invention there is provided a wind turbine cluster comprising a plurality of wind turbines being electrically connected together, wherein one wind turbine of the plurality of wind turbines is a wind turbine as elucidated above.

The provided wind turbine cluster is based on the idea that one wind turbine can be equipped with the above elucidated electric assembly which can act for all wind turbines as a voltage converter for converting the voltage of the power signal being produced by each one of the wind turbines (if applicable with a step-up transformer being assigned to the wind turbine) into a voltage level being used to feed the electric power into a subsea cable which is connecting the plurality of wind turbines being located off-shore with a power grid being located on-shore.

Descriptive speaking, the transformer of the electric assembly being located at one of the wind turbines, which one in this document is called the AC booster wind turbine, shall connect a number of wind turbines, at least two, but more often a cluster of wind turbines. The number of wind turbines in such a cluster could vary from a single string to a number of strings, e.g. three strings each with a number of wind turbines e.g. 3 to 15 wind turbines.

With the wind turbine cluster described in this document the traditional collector platform(s) by transformers being located directly on selected wind turbines on a platform added to the turbine foundation or to a transition piece can be avoided.

According to a further aspect of the invention there is provided a method for mounting an electric assembly as elucidated above to a tower of a wind turbine. The provided method comprises (a) assembling the electric assembly, (b) transporting the electric assembly as a single piece from an on-shore location to an off-shore location, and (c) mounting the electric assembly to the tower at the off-shore location.

Also the described method is based on the idea that when handling and transporting the electric assembly all components of the electric assembly are unified as a single piece. This facilitates not only the installation of the electronic assembly at the wind turbine tower but also a transportation of the electronic assembly to the site where the off-shore wind turbine is erected.

Preferably, the electric assembly is provided with an appropriate electric connection arrangement and the tower (in particular a tower platform where the electric assembly is installed) is provided with appropriate cable termination arrangements such that when mechanically placing the electric assembly in its final position the transformer and its external equipment is automatically connected (a) with an electric generator, an electric inverter and/or a step-up transformer of the wind turbine and (b) with the subsea cable.

According to an embodiment of the invention the method further comprises pretesting at least some of the electric functions of the electric assembly at the on-shore location. This may mean that the operational capability of the electric assembly will be evaluated already at the on-shore location. In case any error arises, a further use of the electric assembly will be interrupted and in particular a transportation of the electric assembly will not be carried out. The electric assembly may then be repaired or a new faultless electric assembly will be used. This may provide the advantage that when installing the electric assembly at the off-shore location at the tower of the wind turbine one can be quite sure that the electric assembly will be operating correctly. This makes the whole installation process more reliable.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
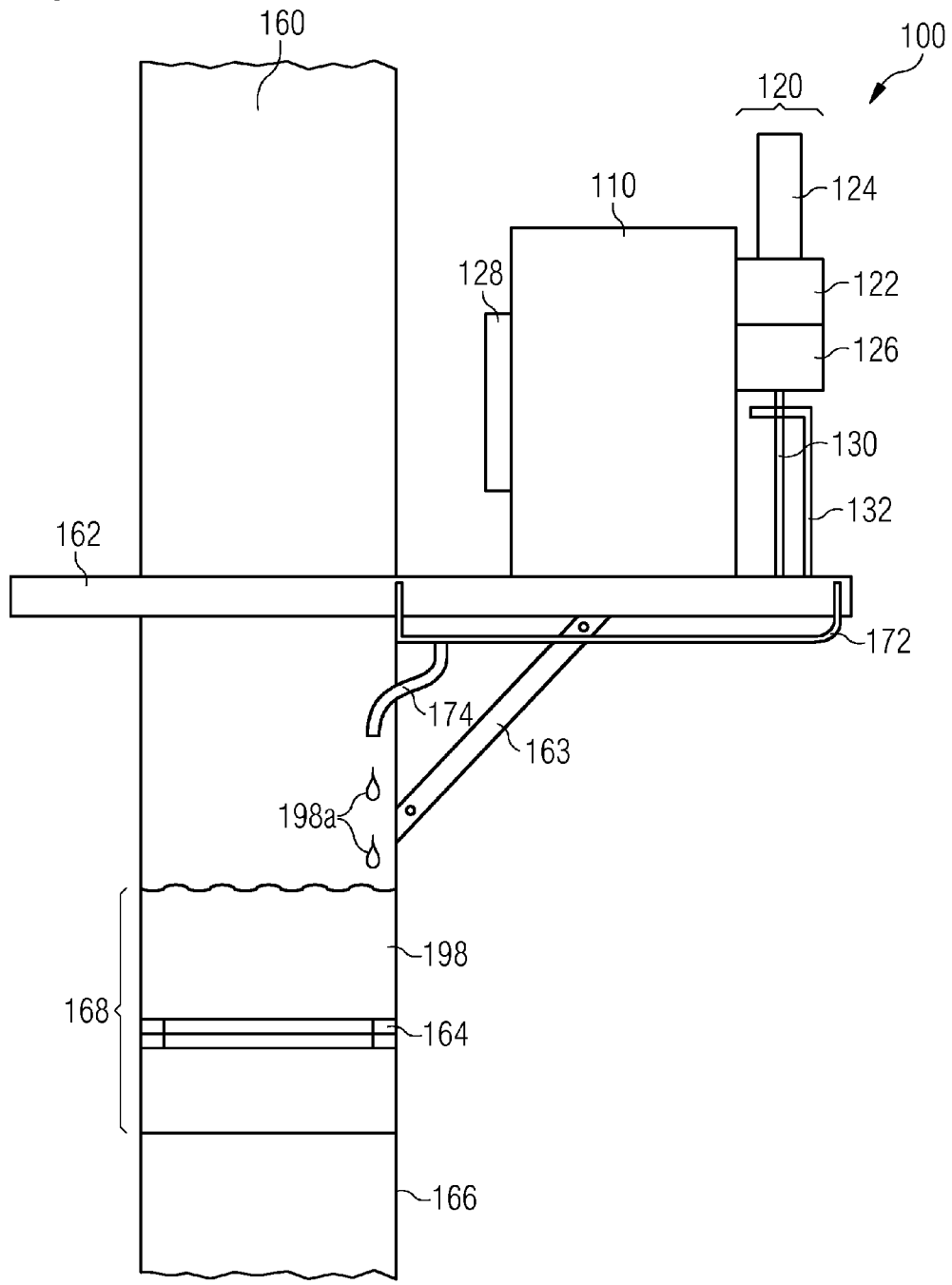
FIG. 1 shows in a side view an electric assembly comprising a transformer and external equipment, wherein the electric assembly is mounted on a platform of a tower of a wind turbine.

The illustration in the drawing is schematically. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Figure 2:
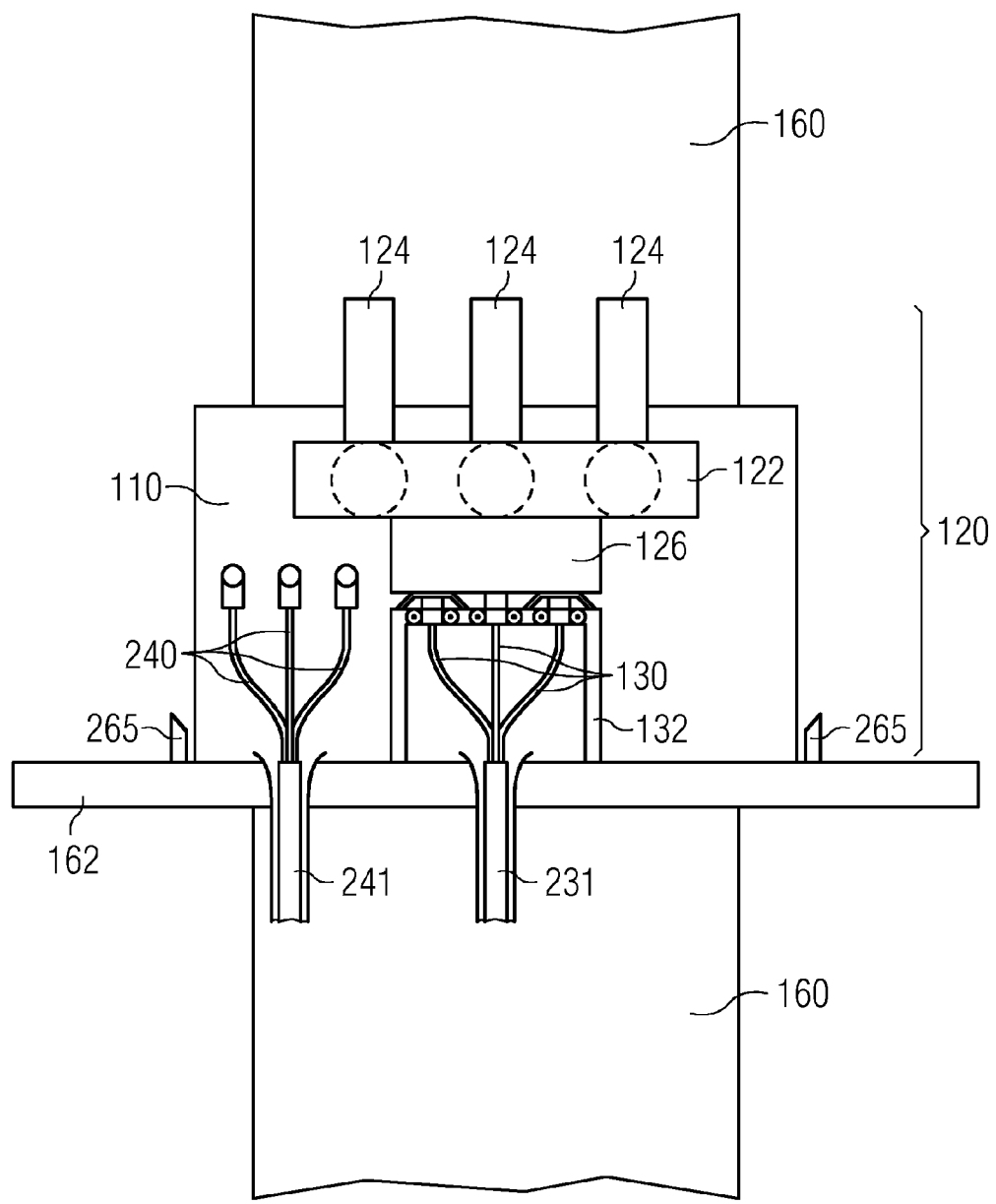
FIG. 2 shows the electric assembly and the platform depicted in FIG. 1 in a front view.

In the following a preferred embodiment of the invention will be described with reference to FIG. 1 and to FIG. 2. Thereby, FIG. 1 shows the embodiment in a side view and FIG. 2 shows the same embodiment in a front view. With respect to a vertical direction both Figures show a middle section of an off-shore wind turbine wherein a horizontal platform 162 is mounted laterally to a tower 160 of the wind turbine. In order to provide a mechanical stability the platform 162 is supported by a support structure 163 (best seen in FIG. 1).

On the platform 162 there is located an electric assembly 100. The electric assembly 100 comprises a transformer 110 which is used for stepping up the voltage of an electric power signal provided by the wind turbine (by means of an electric generator, a AC-DC-AC inverter and a step-up transformer being assigned to the wind turbine) from a medium voltage (MV) power signal (e.g. 33 kV or 66 kV) to a high voltage (HV) power signal (e.g. 132 kV, 150 kV or 220 kV). The HV voltage power signal is then fed to a non depicted HV subsea cable for transporting the electric energy to an electric power grid which is located on-shore.

According to the embodiment described here the transformer 110 collects electric MV power signals from a plurality of other wind turbines which are not depicted in the FIGS. 1 and 2 and which are not provided with such a transformer. Therefore, the electric assembly 100 acts as an off-shore substation which has no own foundation but which uses the platform 162 as its foundation.

In order to allow for a reliable operation of the transformer 110 and in order enable a safe maintenance work the electric assembly 100 comprises external equipment 120, which in accordance with the invention is firmly attached to the transformer 110 such that the whole electric assembly 100 can be handled as a single unit. This makes a transportation to the off-shore site of erection of the wind turbine and a proper installation on the platform 162 much easier than a corresponding handling of a known electric assembly where the components of the external equipment 120 and the transformer have to be handled separately.

The external equipment 120 comprises an earthing switch and/or an electric disconnector 122. In the embodiment described here both the earthing switch and the electric disconnector are realized as a gas insulated switchgear (GIS) 122. By utilizing the earthing switch 122 the transformer 110 and/or other electric cables can be connected to ground e.g. in case a maintenance work has to be done. In this way a safe working condition for a maintenance man or woman can be realized in a simple and effective manner. With the electric disconnector the transformer 110 can be disconnected from the wind turbine and/or from the subsea cable. This can be done in case of emergency and/or also in case of maintenance or service work which may has to be done from time to time.

Further, as an optional feature, the external equipment 120 may comprise three surge arrestors 124 (one for each phase of a rotary current, see FIG. 2). With the surge arrestors 124, which are electrically connected to the transformer 110 either directly or indirectly, an effective protection against overvoltage situations can be achieved.

Furthermore, the external equipment 120 comprises an electric connection arrangement 126 which is used to connect the electric assembly 100 respectively the transformer 110 to both (a) a first cable termination arrangement 240 being assigned to the wind turbine (see only FIG. 2) and to other not depicted wind turbines and (b) a second cable termination arrangement 130 being assigned to the non depicted HV subsea cable. As can be seen from FIG. 2, the first cable termination arrangement 240 is connected to the wind turbine and to the other wind turbines via a MV cable 241 and the second cable termination arrangement 130 is connected to the HV subsea cable via a HV cable 231.

As can be only seen from FIG. 1, the external equipment 120 further comprises a cooling device 128 for cooling the transformer 110. The cooling device 128 is mounted to a housing of the transformer 110. The cooling device 128 may be realized by means of any appropriate physical structure such as e.g. cooling radiators and/or cooling fans. Therefore, the cooling device 128 is depicted only schematically.

According to the embodiment described here a bracket 132 is used for holding the second cable termination arrangement 130 consisting of three plug connectors in place.

As can be best seen from FIG. 1, below the transformer 110 and under the platform 162 there is provided a collection tray 172. This collection tray 172 is used as a recipient for oil being normally used as an insulating and/or cooling medium for the windings of the transformer 110. However, under extreme operational conditions of the transformer 110 this oil might leak out from a casing of the transformer 110. In order to avoid a pollution of the sea water this oil must be collected by the collection tray 172. By contrast to know solutions for preventing oil from flowing or dropping into the sea the oil will not stay in the collection tray 172. According to the embodiment described here the oil will be forwarded via a drain pipe 174 into the interior of the tower 160.

As can be seen from FIG. 1, within the tower 160 there is formed a collecting tank 168. According to the embodiment described here the collecting tank 168 is formed by a transition piece or a jacket leg 166 as the bottom boundary and the inner wall of the tower 160 as the lateral boundary. A corresponding oil bath, which in the longitudinal directions extends over a flange connection 164 of the tower, is indicated with reference numeral 198 in FIG. 1. Oil drops falling into the oil bath 198 are indicated in FIG. 1 with reference numeral 198a.

As can be seen from FIG. 2, on the upper side of the platform 162 there are provided mechanical guide structures 265. When placing the electric assembly 100 onto the platform 162 by lowering the electric assembly 100, e.g. by means of a crane, the mechanical guide structures 265 make sure that the electric assembly 100 will be placed at its proper position. Only when placing the electric assembly 100 in its proper position it can be made sure that the electric connection arrangement 130 fits both with the first cable termination arrangement 240 and with the second cable termination arrangement 130.

Figure 3:
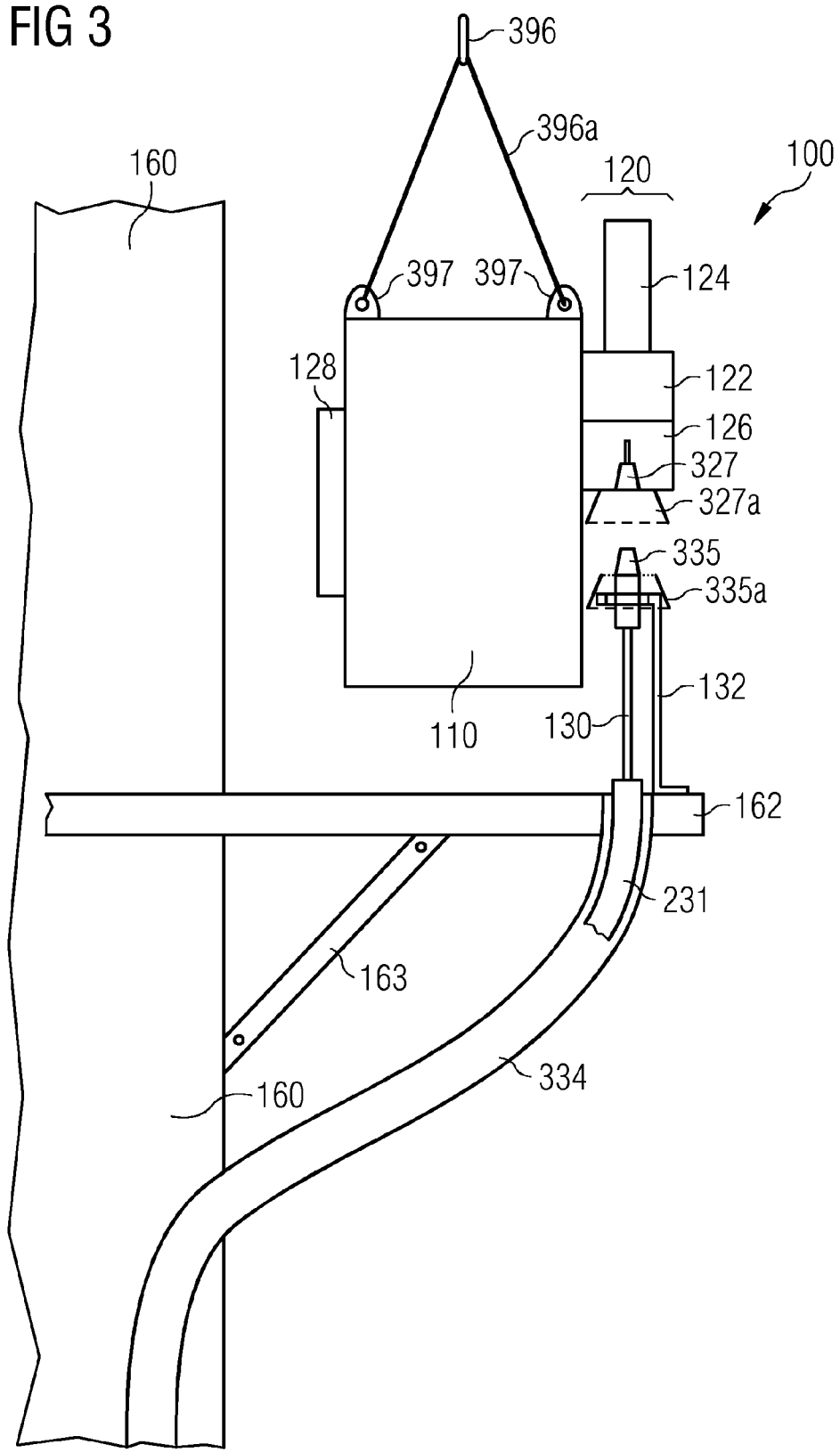
FIG. 3 illustrates an installation of the electric assembly onto the platform.

FIG. 3 illustrates an installation of the electric assembly 100 onto the platform 162. The electric assembly 100 hangs via a wire or a chain 396a, which is attached to mounting eyes 397, at a crane hook 396. When a not depicted crane lowers the crane hook 396, the electric assembly 100 is lowered onto the platform 162 and will rest at its predefined position because of the mechanical guide structures, which are not depicted in FIG. 3. Thereby, plug sockets 327 of the electric connection arrangement 126 spatially meet with corresponding plug connectors 335 of the second cable termination arrangement 130. Inclined guide surfaces 327a and 335a make sure that there is no unwanted canting between the plug sockets 327 and the plug connectors 335.

According to the embodiment described in FIG. 3, the HV cable 231 which is used for electrically connecting the transformer 110 with the not depicted subsea cable is guided within a flexible tube 334. Of course, also non flexible guide structures can be used for accommodating the HV cable 231.

At this point it is mentioned that also the MV cable connecting the transformer 110 with the wind turbine can be guided in a corresponding guide structure.

Figure 4:
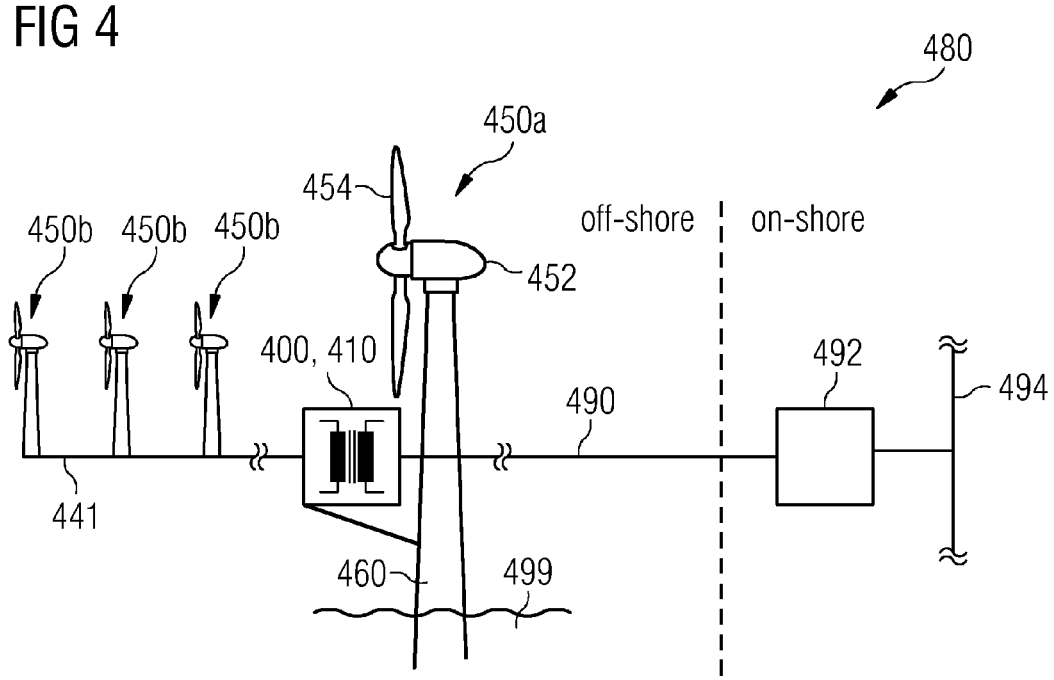
FIG. 4 shows a wind turbine cluster wherein one wind turbine of the cluster is provided with a platform and an electric assembly in accordance with an embodiment of the invention installed on the platform.

FIG. 4 shows a wind turbine cluster 480 comprising a plurality of wind turbines 450b and one wind turbine 450a.

Only the wind turbine 450*a* is provided with an electric assembly 400 comprising a transformer 410 as elucidated above.

Ac can be seen from FIG. 4, the wind turbine 450*a* comprises a tower 460, a nacelle 452 and a rotor 454. The tower 460 is installed at a seabed 499 by means of a non depicted monopile. The same holds of course also for the other wind turbines 450*b*. Via a common MV cable 441 the other wind turbines 450*b* and the wind turbine 450*a* are connected to the transformer 410. As elucidated already above, the transformer 410 converts the MV power signals provided by the wind turbines 450*a*, 450*b* into a HV power signal provided to a HV subsea cable 490. The HV subsea cable 490 forwards the HV power signals to an on-shore substation 492. The on-shore substation 492 acts as a high power interface to a power grid 494 being located also on-shore.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:

1. An electric assembly for electrically connecting at least one wind turbine being located off-shore with an electric subsea cable being connected to an on-shore power grid, the electric assembly comprising
    a transformer for transforming a first voltage level being provided by the at least one wind turbine to a second voltage level of the subsea cable, and
    an external equipment being electrically and mechanically connected to the transformer for controlling an operation of at least the transformer, the external equipment comprises a gas insulated switchgear and an electric connection arrangement which receives a plug connector on a platform of the wind turbine such that an automatic plug in connection between the electric connection arrangement and the plug connector is established therebetween,
    wherein the transformer and the external equipment are formed by a preinstalled package, which can be mechanically handled as a single piece, and lowering the single piece onto the plug connector of the platform establishes the automatic plug in connection between the electric connection arrangement and the plug connector.

2. The electric assembly as set forth in claim 1, wherein the external equipment comprises an earthing switch.

3. The electric assembly as set forth in claim 1, wherein the external equipment comprises an electric disconnector.

4. The electric assembly as set forth in claim 1, wherein the electric connection arrangement is configured for electrically connecting the electric assembly to a first cable termination arrangement being assigned to the wind turbine and/or to a second cable termination arrangement being assigned to the subsea cable.

5. The electric assembly as set forth in claim 1, wherein the external equipment comprises a cooling device for cooling the transformer.

6. A wind turbine comprising
    an electric assembly as set forth in claim 1.

7. The wind turbine as set forth in claim 6, further comprising
    a tower and
    a platform being mounted to the tower and being located outside of the tower,
    wherein the electric assembly is located on the platform.

8. The wind turbine as set forth in claim 7, further comprising
    a collecting tank for collecting a fluid being lost from the transformer, and
    a fluid communication device for connecting the transformer with the collecting tank in such a manner that a fluid being lost from the transformer is transferred to the collecting tank.

9. The wind turbine as set forth in claim 8, wherein the collecting tank is located within the tower of the wind turbine.

10. A wind turbine cluster comprising
    a plurality of wind turbines being electrically connected together,
    wherein one wind turbine of the plurality of wind turbines is a wind turbine as set forth in claim 6.

11. A method for mounting an electric assembly as set forth in claim 1 to a tower of a wind turbine, the method comprising
    assembling the electric assembly,
    transporting the electric assembly as a single piece from an on-shore location to an off-shore location, and
    mounting the electric assembly to the tower at the off-shore location.

12. The method as set forth in claim 11, further comprising pretesting at least some of the electric functions of the electric assembly at the on-shore location.

13. The electric assembly as set forth in claim 1, wherein the external connection arrangement comprises guiding side walls made from an electric conductive material.

* * * * *